US009513678B2

(12) United States Patent
Moore

(10) Patent No.: US 9,513,678 B2
(45) Date of Patent: *Dec. 6, 2016

(54) ELECTRONICS ENCLOSURE WITH REDUNDANT THERMAL SENSING ARCHITECTURE

(71) Applicant: International Business Machines Corporation, Armonk, NY (US)

(72) Inventor: Arden L. Moore, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,546

(22) Filed: Jan. 8, 2016

(65) Prior Publication Data

US 2016/0116953 A1    Apr. 28, 2016

Related U.S. Application Data

(63) Continuation of application No. 14/032,273, filed on Sep. 20, 2013, now Pat. No. 9,261,930, which is a continuation of application No. 14/013,147, filed on Aug. 29, 2013.

(51) Int. Cl.
| | |
|---|---|
| G01K 1/08 | (2006.01) |
| G06F 1/20 | (2006.01) |
| G06F 11/07 | (2006.01) |
| G06F 11/30 | (2006.01) |

(52) U.S. Cl.
CPC ........... *G06F 1/206* (2013.01); *G06F 11/0787* (2013.01); *G06F 11/3058* (2013.01)

(58) Field of Classification Search
CPC ....... G06F 11/3058; G06F 1/20; G06F 1/206
See application file for complete search history.

(56) References Cited

U.S. PATENT DOCUMENTS

| | | | | |
|---|---|---|---|---|
| 4,401,095 A | * | 8/1983 | DuLoft | .................. F02M 33/04 |
| | | | | 123/523 |
| 5,713,030 A | | 1/1998 | Evoy | |
| 5,805,403 A | | 9/1998 | Chemla | |
| 7,014,357 B2 | | 3/2006 | Severson | |

(Continued)

OTHER PUBLICATIONS

"U.S. Appl. No. 14/032,273 Office Action", May 28, 2015, 7 pages.

(Continued)

*Primary Examiner* — Elias Desta
(74) *Attorney, Agent, or Firm* — DeLizio Law, PLLC

(57) ABSTRACT

Described herein is a system and method for downstream redundant thermal sensing in a computer system. The system may determine that a component temperature of a component of the computer system has surpassed a first temperature threshold. The system may determine a downstream thermal sensor that is downstream from the component, wherein downstream is based on airflow through the computer system. The system may determine a downstream temperature at the downstream thermal sensor. The system may determine whether the downstream temperature exceeds a second temperature threshold. In response to determining the downstream temperature exceeds the second temperature threshold, the system may determine whether other thermal sensors detect elevated operating temperatures. In response to determining the other thermal sensors do not detect elevated operating temperatures, the system may initiate cooling.

18 Claims, 4 Drawing Sheets

(56) References Cited

U.S. PATENT DOCUMENTS

| | | | |
|---|---|---|---|
| 7,137,734 B2* | 11/2006 | Muehlig | G01K 17/006 374/14 |
| 7,826,215 B2 | 11/2010 | Glover | |
| 9,261,930 B2* | 2/2016 | Moore | G06F 1/206 |
| 2004/0174674 A1 | 9/2004 | Stewart et al. | |
| 2008/0060363 A1 | 3/2008 | Crippen et al. | |
| 2015/0066419 A1 | 3/2015 | Moore | |
| 2015/0066420 A1 | 3/2015 | Moore | |

OTHER PUBLICATIONS

"U.S. Appl. No. 14/013,147 Office Action", May 18, 2016, 15 pages.

\* cited by examiner

ELECTRONICS ENCLOSURE WITH REDUNDANT THERMAL SENSING ARCHITECTURE

RELATED APPLICATIONS

This application is a Continuation of and claims the priority benefit of U.S. application Ser. No. 14/032,273 filed Sep. 20, 2013 which is a continuation of U.S. application Ser. No. 14/013,147 filed Aug. 29, 2013.

BACKGROUND

Embodiments of the inventive subject matter generally relate to the field of computer systems and more particularly, to temperature management in computer systems.

Oftentimes, individual components of a computer system (e.g., processors, memory, boards, cards, etc.) have thermal sensors affixed or located nearby. The thermal sensors report to a central controller. When a thermal sensor communicates to the central controller that the temperature of a component has increased beyond a threshold, the central controller can take action to decrease the temperature of the component. For example, the central controller can increase fan speed, shut down the component, move workload from the overheating component to another component, etc. Unfortunately, thermal sensors can malfunction. For example, a thermal sensor can indicate that the temperature of a processor has exceeded the threshold, although the processor is currently operating within a safe range. When a thermal sensor malfunctions, the central controller may increase fan speed, shut down the processor, etc. unnecessarily, resulting in undesired operating characteristics such as fan noise, decreased performance, etc. Systems also exist which also include redundant thermal sensors on the components (e.g., two thermal sensors on each component), which increases cost.

SUMMARY

Embodiments include determining, based on component temperature information of a thermal sensor associated with a component, that a temperature of the component of a computer system has surpassed a temperature threshold. A thermal sensor that is downstream from the component is identified, wherein the downstream thermal sensor is downstream from the component as defined by airflow through the computer system. Downstream temperature information as measured by the downstream sensor is determined. The downstream temperature information and the component temperature information are compared.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to a central controller requesting and receiving temperature information from downstream sensors in response to receiving an indication of elevated temperature of a component, in some embodiments, the central controller accesses data containing temperature information recorded by the downstream sensors in response to receiving an indication of elevated temperature of a component. In other instances, well-known instruction instances, protocols, structures and techniques have not been shown in detail in order not to obfuscate the description.

Designing a system with redundant thermal sensors downstream from component thermal sensors allows verification of overheat situations and identification of malfunctioning component thermal sensors within the system. Fans of the system create airflow that passes over system components before reaching the downstream redundant thermal sensors. When a component thermal sensor reports a possible overheat situation, temperature information can be requested from a downstream redundant thermal sensor(s). The system can then use the information from the downstream redundant thermal sensor to either verify the report from the component thermal sensor or take action pursuant to the component thermal sensor possibly malfunctioning. The downstream redundant sensors can be placed in a system at a lower cost than adding redundant sensors to the components.

Figure 1A:
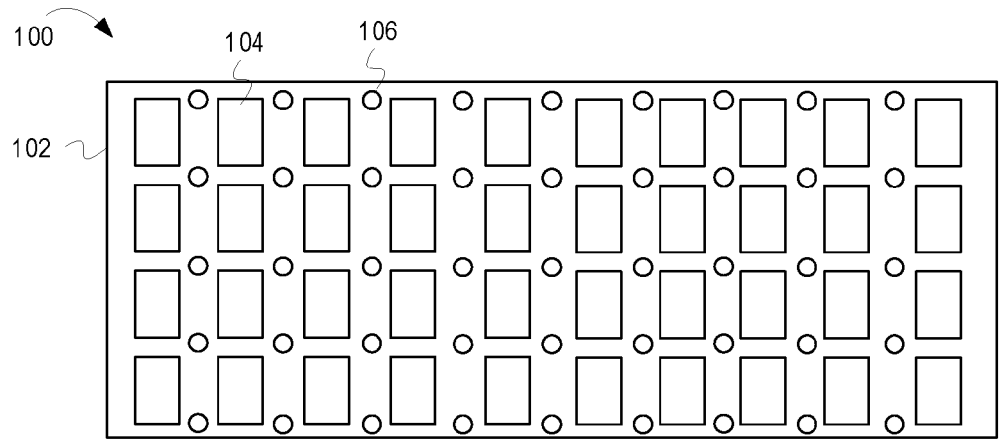
FIG. 1A depicts an example downstream sensor array 100 and corresponding bulkhead 102.

FIG. 1A depicts an example downstream sensor array 100 and corresponding bulkhead 102. The downstream sensor array 100 comprises a bulkhead 102 and thermal sensors 106. In some embodiments, the bulkhead 102 is a metal structure containing passageways 104 through which air can flow. The thermal sensors 106 are mounted on the bulkhead 102, and are operable to measure the temperature of the air flowing through the passageways 104 of the bulkhead 102. The downstream sensor array 100 is positioned in a case or other system housing, as depicted in FIG. 1B.

Figure 1B:
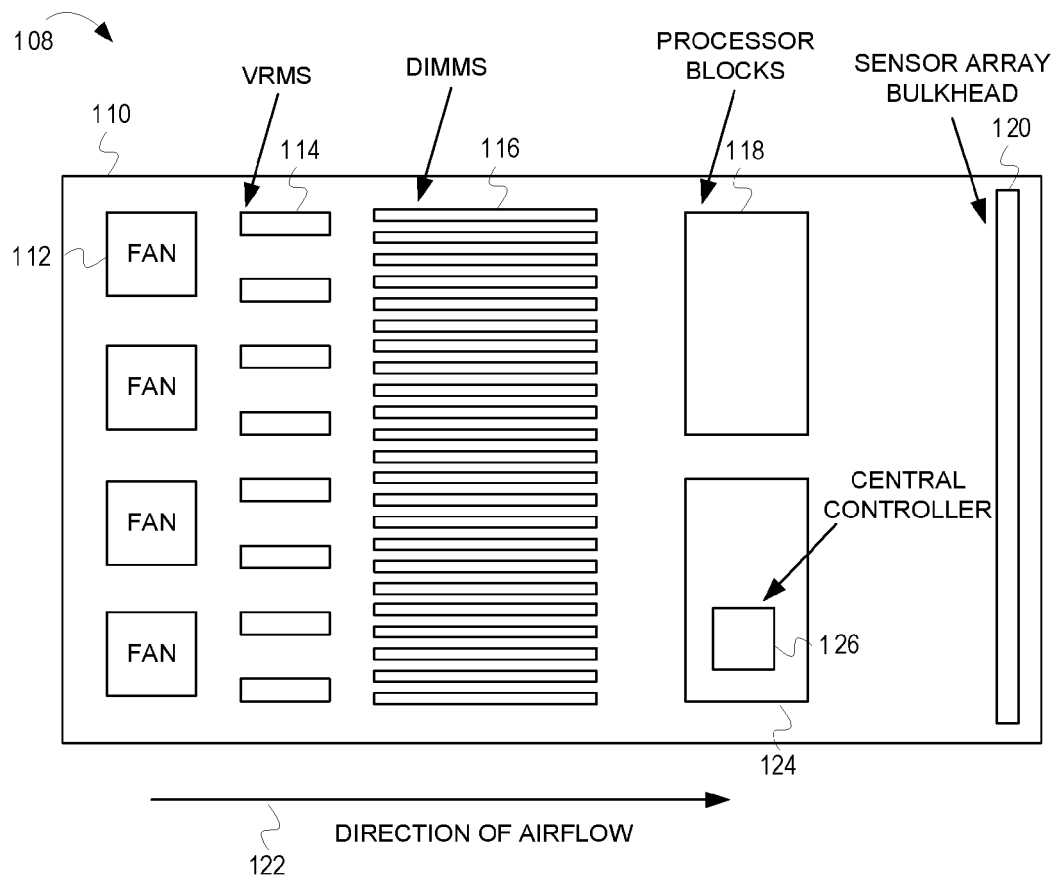
FIG. 1B depicts an overhead view of example computer system 108, including sensor array bulkhead 120.

FIG. 1B depicts an overhead view of an example system 108, including sensor array bulkhead 120. Sensor array bulkhead 120 is similar in structure to bulkhead 102 depicted in FIG. 1A. The example system 108 includes a housing 110, fans 112, voltage regulator modules (VRMs) 114, dual in-line memory modules (DIMMs) 116, processor $block_1$ 118, processor $block_2$ 124, sensor array bulkhead 120, and central controller 126. The central controller 126 can be software running on a processor block (as depicted in FIG. 1B), a microprocessor coupled to a central bus, etc. The central controller 126 can operate to request, receive, and process temperature readings from the thermal sensors. Additionally, in some embodiments, the central controller can initiate cooling action to lower the temperature of the system 108 and/or the system's 108 components. In some embodiments, the system can include greater or fewer components. Additionally, the components (e.g., VRMs, DIMMs, processor blocks, etc.) include thermal sensors (not shown).

While the system 108 is operating, air flows from left to right (as depicted by arrow 122) through the housing 110. As the components perform tasks, their temperature increases. For example, under heavy workload, the processor block$_2$'s 124 temperature increases beyond a threshold. When the processor block$_2$'s 124 temperature rises beyond the threshold, as measured by a thermal sensor on or proximate to the processor block$_2$ 124, the temperature is reported to a central controller (not shown). The central controller can verify that the temperature of the processor block$_2$ 124 has indeed exceeded the threshold by polling (i.e., requesting temperature information from) a downstream thermal sensor in the sensor array bulkhead 120 that is associated with the processor block$_2$ 124. For example, if the thermal sensor associated with the processor block$_2$ 124 is reporting an overheat situation, one or more thermal sensors on the thermal sensor array 120 downstream from the processor block$_2$ 124 will likewise detect an increase in temperature. If the one or more thermal sensors associated with the processor block$_2$ 124 on the thermal sensor array 120 downstream from the processor block$_2$ 124 are reporting an increase in temperature, it can indicate that the processor block$_2$ 124 is in fact overheating, and any necessary action can be taken to decrease the temperature of the processor block$_2$ 124. If the one or more thermal sensors associated with the processor block$_2$ 124 on the thermal sensor array 120 downstream from the processor block$_2$ 124 are not reporting an increase in temperature, it can indicate that the processor block$_2$ 124 is not overheating and that the thermal sensor associated with the processor block$_2$ 124 is malfunctioning. Thus, system-level thermal sensing redundancy can be provided without requiring multiple thermal sensors on any one component.

Figure 2:
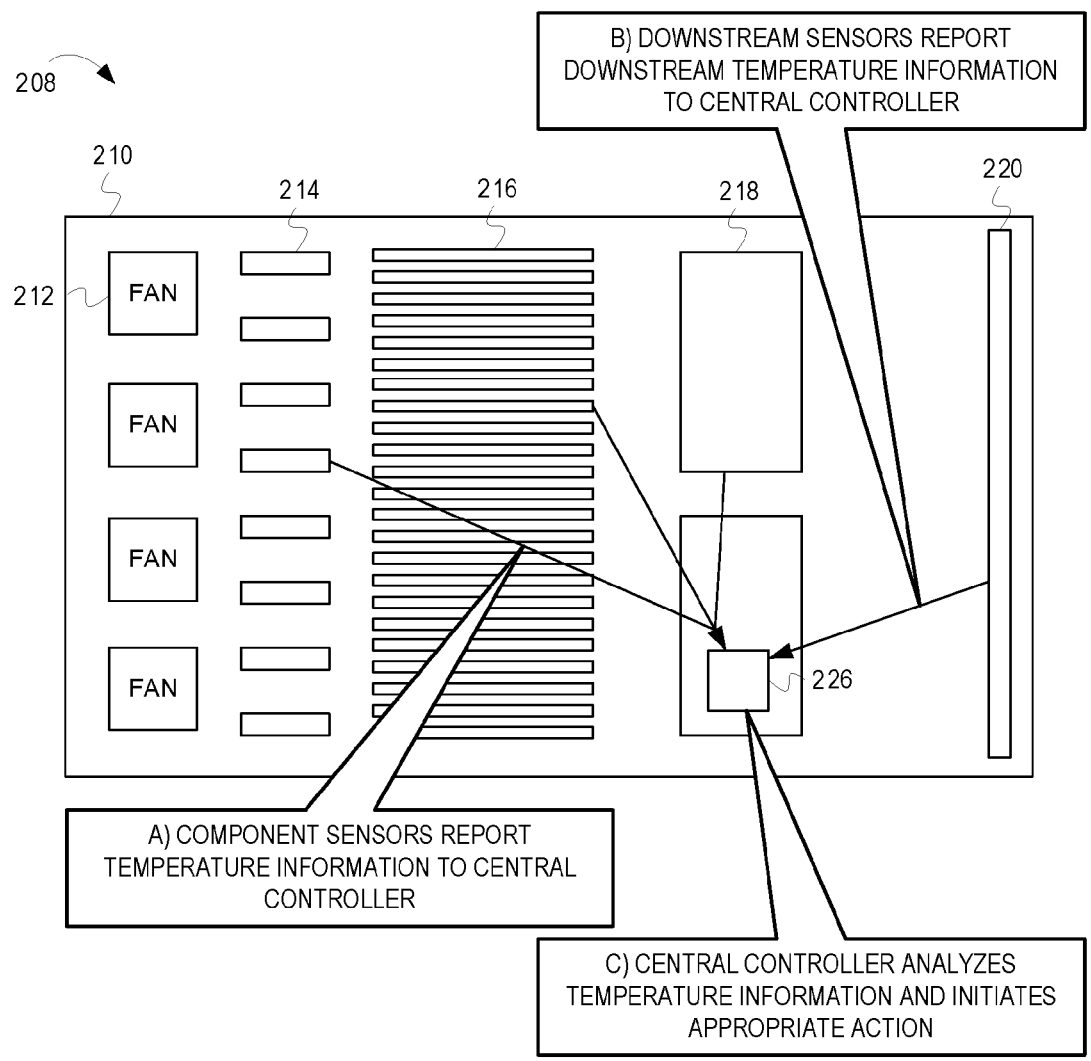
FIG. 2 is a conceptual diagram depicting an example system 208 having a downstream sensor array 220 for redundant thermal sensing.

FIG. 2 is a conceptual diagram depicting an example system 208 having a downstream sensor array 220 for redundant thermal sensing. The system 208 comprises a housing 210, fans 212, VRMs 214, DIMMs 216, processor blocks 218, sensor array bulkhead 220, and a central controller 226 depicted as software running on one of the processor blocks 218. FIG. 2 depicts operations at stages A-C. The stages are examples and are not necessarily discrete occurrences over time (e.g., operations of different stages may overlap). Additionally, FIG. 2 is an overview of example operations.

At stage A, components (i.e., the VRMs 214, DIMMs 216, and processor blocks 218) report temperature information to the central controller 226. The temperature information can be actual temperatures measured by thermal sensors associated with the components, flags or notifications that a component has exceeded a threshold temperature, etc. This reporting can be achieved in a variety of ways. For example, the components (or thermal sensors associated with the components) can report temperature information directly to the central controller 226 over a central bus. Additionally, groupings of a same type of component can report temperature readings to a local controller which in turn reports the temperature readings to the central controller 226. For example, all DIMMs 216 (or thermal sensors associated with the DIMMs 216) report temperature information to a local controller, which in turn reports temperature information to the central controller 226. Alternatively, the components (or thermal sensors associated with the components 212-218) can periodically write the temperature information (e.g., current temperature readings or notifications) to a data file. The central controller 226 can access the data file to receive the temperature information.

At stage B, the downstream sensors of the sensor array bulkhead 220 report downstream temperature information to the central controller 226. Again, the temperature information can be actual temperatures measured by thermal sensors associated with the components, flags or notifications that a component has exceeded a threshold temperature, etc. Likewise, this reporting can be achieved in a variety of ways. For example, the central controller 226 determines an appropriate downstream sensor (as discussed in FIG. 3) and requests the temperature information from the appropriate downstream sensor. Alternatively, the downstream sensors of the sensor array bulkhead 220 can write temperature information to a memory location accessible to the central controller 126, and the central controller 126 can access the memory location to receive the temperature information corresponding to the appropriate downstream sensors.

At stage C, the central controller 226 analyzes the temperature information and initiates an appropriate action. For example, if the temperature information for a component indicates that the component is overheating, and the temperature information for an appropriate downstream sensor verifies that the component is overheating, the central controller 226 can initiate a cooling action (e.g., increasing fan speed, decreasing workload for the component, etc.). As another example, if the temperature information for a component indicates that the component is overheating, but the temperature information from an appropriate downstream sensor does not indicate an increase in temperature, the central controller 226 will log an error, indicating that a thermal sensor associated with the component may be malfunctioning.

Figure 3:
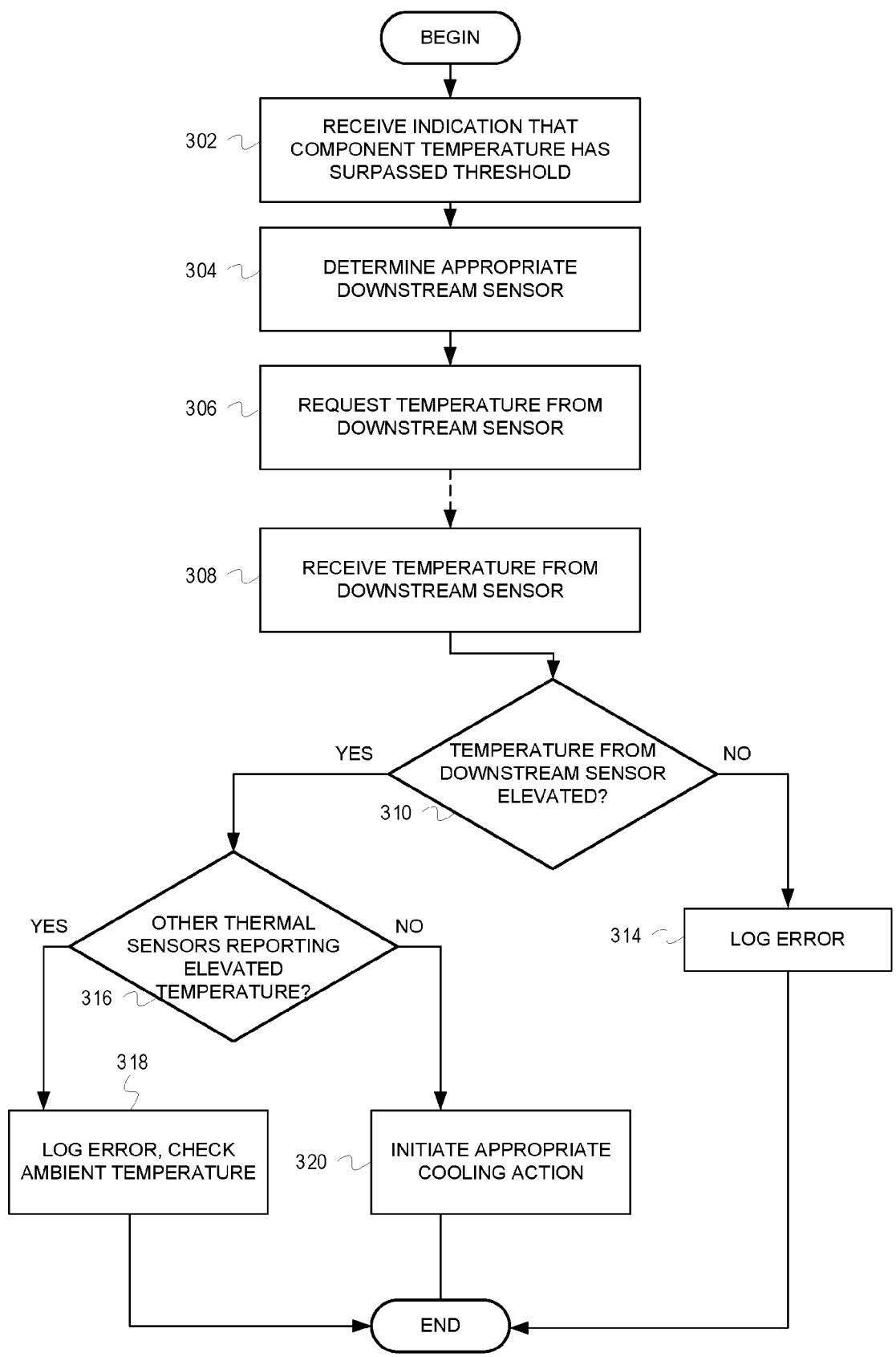
FIG. 3 is a flow diagram of example operations for processing temperature fluctuations in a system with redundant downstream thermal sensors.

FIG. 3 is a flow diagram of example operations for processing temperature fluctuations in a system with redundant downstream thermal sensors. The flow begins at block 302.

At block 302, a central controller receives an indication that a component temperature has surpassed a threshold. For example, a thermal sensor associated with a processor can communicate with the central controller, indicating that temperature of the processor has exceeded 70 degrees centigrade. In some embodiments, thermal sensors are programmed to periodically report temperature readings to a central controller. In such embodiments, the central controller can evaluate the temperature readings and determine whether the operating temperature of any of the components has surpassed a threshold. For example, the central controller can calculate an average of the last five readings and determine if the average surpasses a threshold, determine if any one reading of the last three readings is greater than a temperature threshold, determine if a majority of the last seven readings exceed a threshold, etc. Alternatively, components of the system can be arranged into groups, each group having a local controller. The thermal sensors associated with the components in a group can report temperature readings to the local controller. In such embodiments, the local controller can evaluate the temperature readings and notify the central controller if any of the temperature readings have surpassed a predetermined threshold. The flow continues at block 304.

At block 304, the central controller determines appropriate downstream sensors to poll to determine whether the component's temperature has in fact surpassed the threshold. For instance, the appropriate downstream sensor is the thermal sensor(s) of the thermal sensor array that is in position to record the temperature of air that has passed over the component. For example, the central controller can access a lookup table containing an indication (e.g., an address) of the downstream sensor(s) associated with each component. In some embodiments, the lookup table also includes temperature information for the downstream sensors (e.g., a most recent temperature information entry, temperature information recorded over a period of time, etc.). Alternatively, the central controller can determine the appropriate downstream sensor(s) by accessing a map of the system. For example, the map can depict an overhead view of the system including reference lines running parallel to the direction of the airflow, partitioning the system into sections. The map can also include indications of the section(s) in which each component resides. Using the map, the central controller can determine the section(s) of the system in which the component resides. The appropriate downstream sensor(s) is the thermal sensor(s) that resides in the same section(s) of the system as the component. In some embodiments, the central controller requests a temperature reading from a single thermal sensor. For example, if the component has a small footprint (i.e., occupies a relatively small portion of the housing), the central controller can request a temperature reading from a single thermal sensor that is downstream from the component. Alternatively, the central controller can request temperature readings from more than one thermal sensor. For example, if the component has a large footprint, the central controller can request temperature readings from all thermal sensors that are downstream from the component. The flow continues at block 306.

At block 306, the central controller requests temperature information from the downstream sensor(s). For example, the central control can send a request for temperature information to the bus address for the appropriate downstream sensor determined at block 304. The downstream sensor then sends the temperature information to the central controller. The downstream sensor can take a temperature reading in response to the request, or the downstream sensor can send a temperature reading that was recently measured. In embodiments where the downstream sensors record temperature information in a memory location accessible by the central controller, the central controller reads the temperature information for the appropriate downstream sensor(s). Additionally, the central controller can wait a predetermined period of time before requesting temperature information from the downstream sensor(s). In other words, the central controller can introduce a time lag between receiving the indication that a component temperature has surpassed a threshold and requesting temperature information from the downstream sensor(s), in order to allow air that has passed the component to reach the downstream sensor(s). The flow continues at block 308.

At block 308, the central controller receives the temperature information from the downstream sensor. As previously discussed, the central controller can request temperature information from one or more downstream sensors. In embodiments in which the central controller receives temperature information from multiple downstream sensors, the central controller can aggregate the temperature information (e.g., by averaging the temperature information). Averaging temperature information from multiple downstream sensors can provide another level of redundancy. Accordingly, the central controller receives temperature information from the one or more thermal sensors from which the central controller requested temperature information. The flow continues at decision diamond 310.

At decision diamond 310, the central controller determines if the temperature information received from the downstream sensor(s) indicate that the temperature of the air passing the downstream sensor(s) is elevated. For example, the temperature information received from the downstream sensor(s) may be above a normal operating temperature or a predefined threshold. Alternatively, the downstream sensor(s) can provide multiple temperature readings that were measured over a time period (for example the previous two minutes) to the central controller. The central controller can analyze the temperature information to determine if there is an upward trend in the temperature recorded by the downstream sensor(s) over the time period. Such an upward trend can indicate that the temperature of the component is increasing. If the temperature of the air passing the downstream sensor(s) is not elevated, the flow continues at block 314. If the temperature of the air passing the downstream sensor(s) is elevated, the flow continues at decision diamond 316.

At decision diamond 316, the central controller determines whether other thermal sensors of the thermal sensor array are reporting elevated temperatures. For example, the central controller can request temperature information from thermal sensors of the thermal sensor array that are physically distant from the downstream sensor reporting an elevated temperature. This determination will aid in diagnosing a problem that is causing the increase in operating temperature. For example, if a majority of the downstream sensors (including those that are physically distant from the downstream sensor reporting an elevated temperature) are reporting elevated temperatures, it can indicate that the temperature of the entire system is increasing. The temperature of the entire system increasing can indicate an increase in temperature of the room in which the system is located, which can indicate that there is a problem with the cooling system of the room in which the system is located. If other thermal sensors of the thermal sensor array are not reporting elevated temperatures, the flow continues at block 320. If other thermal sensors of the thermal sensor array are reporting elevated temperatures, the flow continues at block 318.

At block 318, the other thermal sensors of the thermal sensor array are reporting elevated temperatures and the central controller logs the elevated temperature readings (i.e., logs an error). As previously described in the discussion of decision diamond 316, if the temperature of the entire system is increasing, it may indicate that there is a problem with the cooling system of the room in which the system is located. From block 318, the flow ends.

At block 320, the other thermal sensors of the thermal sensor array are not reporting elevated temperatures. Because the downstream sensor(s) is reporting an elevated temperature and the other thermal sensors are not reporting an elevated temperature, it is likely that the temperature of the component has surpassed the threshold and that a thermal sensor associated with the component is not malfunctioning. In some embodiments, the central controller can initiate appropriate cooling action to decrease the temperature of the component. From block 320, the flow ends.

At block 314, the component has reported an elevated temperature and the downstream sensor(s) has not reported an elevated temperature. This discrepancy in temperature readings can indicate that the thermal sensor associated with the component is malfunctioning. The central controller can then log this discrepancy as an error. From block 314, the flow ends.

It is not necessary that all operations of FIG. 3 be performed. For example, the central controller may not request temperature information from downstream thermal sensors that are not associated with the component reporting an elevated temperature. Rather, in some embodiments, the central controller only requests temperature information from downstream thermal sensors associated with components that are reporting elevated temperatures.

Additionally, variations exist in the trigger that prompts polling of downstream sensors. For example, in some embodiments, thermal sensors on or proximate to the components can be programmed to notify the central controller when a threshold has been reached. In other words, temperature information is only reported to the central controller when the temperature of a component has surpassed a temperature threshold. Alternatively, the thermal sensors on or proximate to the components can be programmed to periodically report temperature readings to the central controller. The central controller can determine, based on these temperature readings, that a threshold has been reached and poll the appropriate downstream sensors.

In some cases, a single housing holds multiple boards, processor blocks, etc. stacked on top of one another, creating a system having more than one level of components. In such cases, the map of the system includes both reference lines running parallel to the airflow and level information indicating which level in the stacked system each component resides, creating a two dimensional map. Consequently, in determining the appropriate downstream sensor(s) to poll, the central controller can reference both a vertical position of the component (where the vertical axis is normal to the reference lines) and a level of the component. Additionally, the central controller can consider heat dissipation and transfer when determining whether the temperature information reported by the downstream sensor(s) indicates that the component is overheating, and to aid in determining a cause of the elevated temperature. For example, if a processor block on the highest level is reporting an elevated temperature, the central controller can request temperature information from downstream sensors positioned on lower levels. If the downstream sensors positioned on the lower levels are indicating elevated temperatures, the increased temperature as measured on the highest level may be due in part to heat transfer and accumulation from the lower levels. Consequently, the central controller can initiate an action to cool the lower levels, in lieu of or in addition to, initiating an action to cool the higher.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
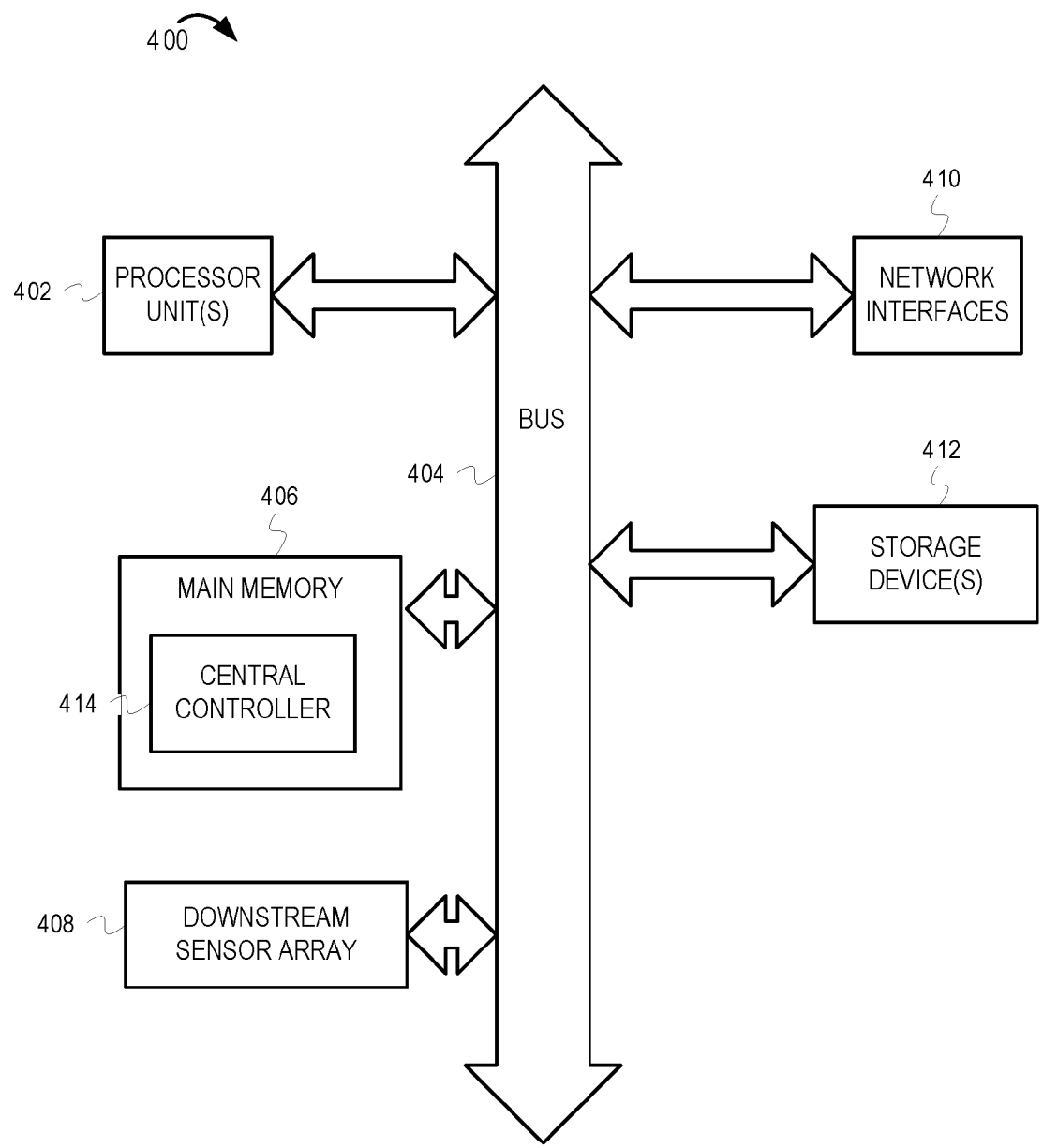
FIG. 4 depicts an example computer system 400 having a downstream sensor array 408.

FIG. 4 depicts an example computer system 400 having a downstream sensor array 408. A computer system includes a processor unit 402 (possibly including multiple processors, multiple cores, multiple nodes, and/or implementing multi-threading, etc.). The computer system includes memory 406. The memory 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 404 (e.g., PCI, ISA, PCI-Express, Hyper-Transport®, InfiniBand®, NuBus, etc.), a network interface 410 (e.g., an ATM interface, an Ethernet interface, a Frame Relay interface, SONET interface, wireless interface, etc.), a storage device(s) 412 (e.g., optical storage, magnetic storage, etc.), and a downstream sensor array 408. The system memory 406 embodies functionality to implement embodiments described above. The system memory 406 includes a central controller 414. The central controller 414 is operable to request, receive, and analyze temperature information from thermal sensors associated with components of the example computer system 400 and thermal sensors of the downstream sensor array 408, as described herein. Any one of these functionalities may be partially (or entirely) implemented in hardware and/or on the processing unit 402. For example, the functionality may be implemented with an application specific integrated circuit, in logic implemented in the processing unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the storage device(s) 412, and the network interface 410 are coupled to the bus 404. Although illustrated as being coupled to the bus 404, the memory 406 may be coupled to the processor unit 402.

While the embodiments are described with reference to various implementations and exploitations, it will be understood that these embodiments are illustrative and that the scope of the inventive subject matter is not limited to them. In general, techniques for redundant thermal sensing as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for downstream redundant thermal sensing in a computer system, the method comprising:
   determining that a component temperature of a component of the computer system has surpassed a first temperature threshold;
   determining a first thermal sensor that is downstream from the component, wherein downstream is based on airflow through the computer system;
   determining a downstream temperature at the first thermal sensor;
   determining whether the downstream temperature exceeds a second temperature threshold; and
   in response to determining the downstream temperature exceeds the second temperature threshold, determining whether one or more other thermal sensors of the computer system detect elevated operating temperatures, the one or more other thermal sensors being different from the first thermal sensor;
   initiating cooling of the component in response to determining the one or more other thermal sensors do not detect elevated operating temperatures, initiating cooling.

2. The method of claim 1, further comprising, in response to determining that the one or more other thermal sensors detect elevated operating temperatures, logging an error message.

3. The method of claim 2, wherein the error message indicates at least one of: a computer system cooling error, and a room cooling system error.

4. The method of claim 1 further comprising, in response to determining the downstream temperature does not exceed the second temperature threshold, logging an error message.

5. The method of claim 4, wherein the error message indicates a fault in a component temperature sensor associated with the component.

6. The method of claim 1, wherein initiating cooling comprises at least one of:
   increasing a speed of a fan; and
   decreasing a workload of the component.

7. A computer program product for redundant thermal sensing in a computer system, the computer program product comprising:
   a computer readable storage medium having computer usable program code embodied therewith, the computer usable program code comprising a computer usable program code configured to:
      determine that a component temperature of a component of the computer system has surpassed a first temperature threshold;
      determine a first thermal sensor that is downstream from the component, wherein downstream is based on airflow through the computer system;
      determine a downstream temperature at the first thermal sensor;
      determine whether the downstream temperature exceeds a second temperature threshold; and
      in response to determining the downstream temperature exceeds the second temperature threshold, determine whether one or more other thermal sensors of the computer system detect elevated operating temperatures, the one or more other thermal sensors being different from the first thermal sensor;

initiate cooling of the component in response to determining the one or more other thermal sensors do not detect elevated operating temperatures.

8. The computer program product of claim 7, the computer usable program code further comprising code configured to, in response to determining that the one or more other thermal sensors detect elevated operating temperatures, log an error message.

9. The computer program product of claim 8, wherein the error message indicates at least one of: a computer system cooling error, and a room cooling system error.

10. The computer program product of claim 7, the computer usable program code further comprising code configured to, in response to determining the downstream temperature does not exceed the second temperature threshold; log an error message.

11. The computer program product of claim 10, wherein the error message indicates a fault in a component temperature sensor associated with the component.

12. The computer program product of claim 7, wherein initiate cooling comprises at least one of:
increase a speed of a fan; and
decrease a workload of the component.

13. An apparatus comprising:
a processor; and
a computer readable storage medium having computer usable program code embodied therewith, the computer usable program code comprising a computer usable program code configured to:
determine that a component temperature of a component of the apparatus has surpassed a first temperature threshold;
determine a first thermal sensor that is downstream from the component, wherein downstream is based on airflow through the computer system;
determine a downstream temperature at the first thermal sensor;
determine whether the downstream temperature exceeds a second temperature threshold; and
in response to determining the downstream temperature exceeds the second temperature threshold, determine whether one or more other thermal sensors of the apparatus detect elevated operating temperatures, the one or more other thermal sensors being different from the first thermal sensor;
initiate cooling of the component in response to determining the one or more other thermal sensors do not detect elevated operating temperatures.

14. The apparatus of claim 13, wherein the computer usable program code is further configured to, in response to determining that the one or more other thermal sensors detect elevated operating temperatures, log an error message.

15. The apparatus of claim 14, wherein the error message indicates at least one of: a cooling error of the apparatus, and a room cooling system error.

16. The apparatus of claim 13, wherein the computer usable program code is further configured to, in response to determining the downstream temperature does not exceed the second temperature threshold; log an error message.

17. The apparatus of claim 16, wherein the error message indicates a fault in a component temperature sensor associated with the component.

18. The apparatus of claim 13, wherein initiate cooling comprises at least one of:
increase a speed of a fan; and
decrease a workload of the component.

* * * * *